(12) United States Patent
Eber

(10) Patent No.: US 12,132,772 B2
(45) Date of Patent: Oct. 29, 2024

(54) SYSTEMS AND METHODS FOR MANAGING DOWNLOADS WITHIN A LOCAL NETWORK

(71) Applicant: DISH Network L.L.C., Englewood, CO (US)

(72) Inventor: Samuel Eber, Englewood, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 0 days.

(21) Appl. No.: 17/975,463

(22) Filed: Oct. 27, 2022

(65) Prior Publication Data

US 2023/0336596 A1    Oct. 19, 2023

Related U.S. Application Data

(60) Provisional application No. 63/322,137, filed on Mar. 21, 2022.

(51) Int. Cl.
*G06F 15/16* (2006.01)
*G06N 5/022* (2023.01)
*H04L 65/61* (2022.01)

(52) U.S. Cl.
CPC ............. *H04L 65/61* (2022.05); *G06N 5/022* (2013.01)

(58) Field of Classification Search
CPC ................................ H04L 65/61; G06N 5/022
See application file for complete search history.

(56) References Cited

U.S. PATENT DOCUMENTS

| | | | | |
|---|---|---|---|---|
| 8,243,679 | B1 * | 8/2012 | Huang | H04W 36/30 455/436 |
| 8,478,836 | B1 * | 7/2013 | Chang | H04L 67/5682 711/122 |
| 8,892,720 | B2 * | 11/2014 | Diaz | H04L 12/40013 709/227 |
| 2014/0310386 | A1 * | 10/2014 | Srinivasan | H04L 67/02 709/219 |
| 2017/0286979 | A1 * | 10/2017 | Chavez | G06N 7/06 |
| 2020/0104112 | A1 * | 4/2020 | Hu | G06F 8/65 |
| 2021/0049048 | A1 * | 2/2021 | Quintana | G06F 9/5027 |
| 2023/0307119 | A1 * | 9/2023 | Volpe | A61N 1/3968 713/2 |
| 2023/0363024 | A1 * | 11/2023 | Kang | H04W 28/02 |

* cited by examiner

*Primary Examiner* — Oleg Survillo
(74) *Attorney, Agent, or Firm* — Seed IP Law Group LLP

(57) ABSTRACT

A download manager system ensures that data required by multiple device on a network is downloaded as few times as possible. The download manager system identifies one or more devices connected to a network, and obtains device information for each of the devices. The download manger system detects that a first device is downloading data. The download manager system determines that a second device may require the downloaded data. The download manger system may cause the data to be stored based on a determination that the second device may require the downloaded data. The download manager system may cause the downloaded data to be transmitted to the second device.

20 Claims, 9 Drawing Sheets device identification table

| Device ID | Device Name | Version | |
|---|---|---|---|
| 1111 | Windows 10 PC | 2.5 | } 401 |
| 2222 | Playstation 5 | 1.4 | } 402 |
| 3333 | Xbox 360 | 4.1 | } 403 |
| 4444 | Pear Tablet 1 | 1.8 | } 404 |
| 5555 | Pear Tablet 2 | 1.6 | } 405 |
| 6666 | Windows 10 Laptop | 2.2 | } 406 |
| ⋮ | ⋮ | ⋮ | |
| 410 | 411 | 412 | |

*Fig. 4* device software version table

| Device ID | Device Name | Software Name | Software Version | |
|---|---|---|---|---|
| 4444 | Pear Tablet 1 | Photo Manager | 1.5 | 501 |
| 5555 | Pear Tablet 2 | Photo Manager | 2.2 | 502 |
| 1111 | Windows 10 PC | Web Browser | 5.5 | 503 |
| 1111 | Windows 10 PC | Streaming: Superhero Movie 3 | N/A | 504 |
| 6666 | Windows 10 Laptop | Streaming Superhero Movie 3 | N/A | 505 |
| 6666 | Windows 10 Laptop | Web Browser | 5.5 | 506 |
| ⋮ | ⋮ | ⋮ | ⋮ | |
| 510 | 511 | 512 | 513 | |

*Fig. 5* downloaded data table

| Device ID | Device Name | Software Name | Downloaded data | |
|---|---|---|---|---|
| 5555 | Pear Tablet 2 | Photo Manager | Update Ver. 2.2 | 601 |
| 1111 | Windows 10 PC | Web Browser | Update Ver. 5.5 | 602 |
| 6666 | Windows 10 Laptop | Streaming: Superhero Movie 3 | Superhero Movie 3 in 4k | 603 |
| ⋮ | ⋮ | ⋮ | ⋮ | |

SYSTEMS AND METHODS FOR MANAGING DOWNLOADS WITHIN A LOCAL NETWORK

BRIEF SUMMARY

Consumers typically own multiple Internet-connected devices, and some consumers may have multiples of the same device, multiple devices with similar software, or may download the same data on multiple devices. User devices frequently download updates, or other data, for software or hardware used by user devices. In the case where a consumer owns multiple devices with the same hardware or software, each user device must individually download the update, or data, even when the data downloaded is the same. Thus, multiple downloads of the same data may occur so that each device which requires the data can obtain the data, which may cause bandwidth issues, affect the consumer's data cap, and requires additional processing power on the part of each of the user devices to individually obtain the downloaded data.

The embodiments disclosed herein address the issues above and thus help solve the above technical problems and improve download management technology by providing a technical solution that ensures that data, such as updates, are downloaded as few times as possible, and is distributed to each user device on the network which requires the data. Additionally, the embodiments disclosed herein are further able to allow user devices to communicate with each other to share the downloaded data. In some embodiments, the download manager system identifies whether a device on the network is downloading data, determines whether a second device is likely to use the downloaded data, causes the data to be stored if the second device is likely to use the data, and causes the data to be transmitted to the second device. In some embodiments, a device downloads data from a source outside the network, receives an indication from a download manager system that another device has already downloaded the data, and obtains the data from another computing device on the network.

BRIEF DESCRIPTION OF THE SEVERAL VIEWS OF THE DRAWINGS

FIG. 4 is a table diagram showing sample contents of a device identification table used by the download manager system, according to various embodiments described herein.

FIG. 5 is a table diagram showing sample contents of a device software version table used by the download manager system, according to various embodiments described herein.

FIG. 6 is a table diagram showing sample contents of a downloaded data table used by the download manager system, according to various embodiments described herein.

DETAILED DESCRIPTION

Figure 1:
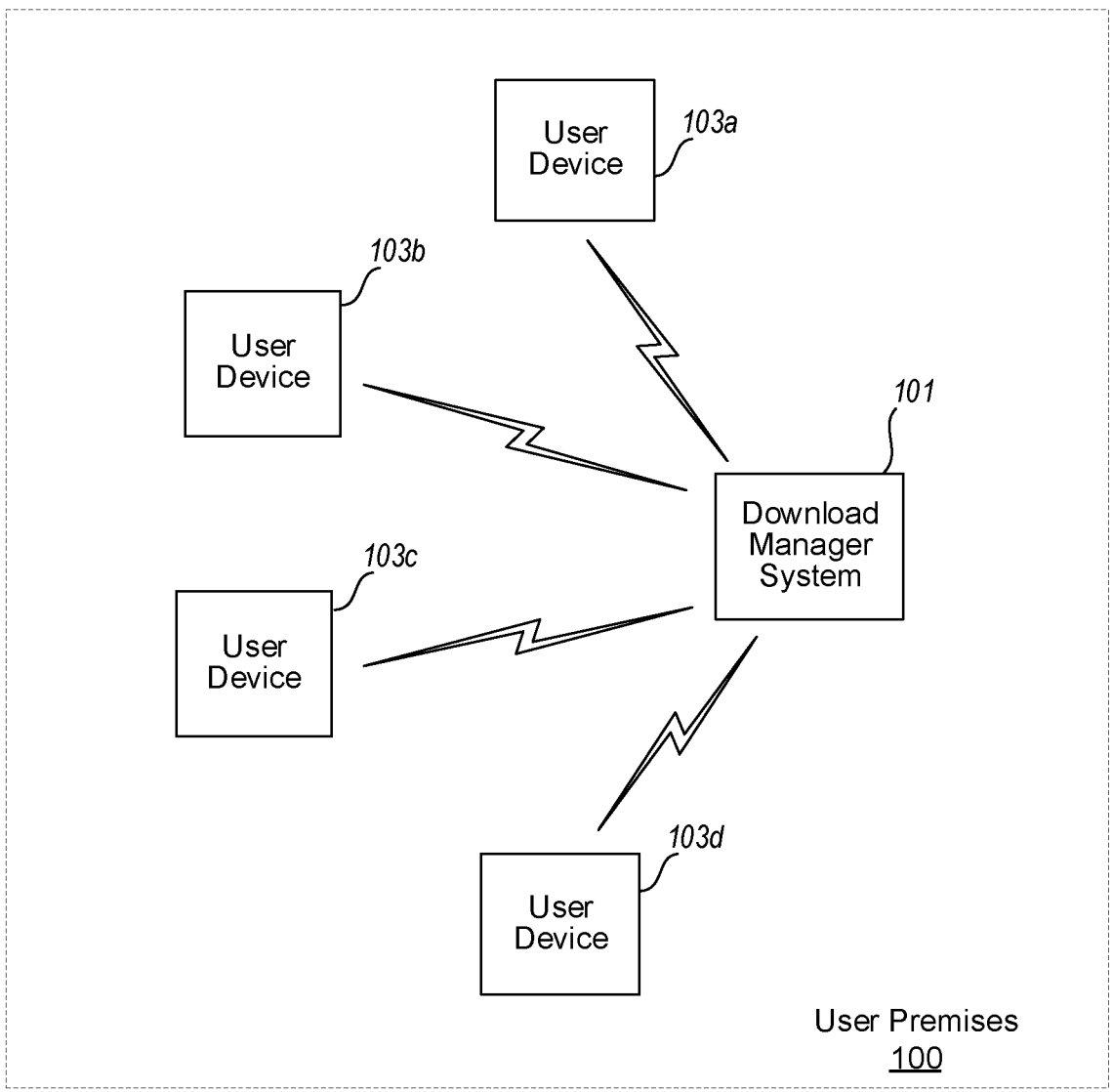
FIG. 1 is a diagram depicting an example download manager system and a user premises in which a download manager system may be implemented.

In local networks, users of a local network (collectively "consumers" or "users"), may have multiple devices connected to the network, with some of those devices being similar devices or having similar software. When an update to a particular device or software is available, more than one device may need to download the same update data. Thus, the same update or data (collectively "data") may be downloaded by each device which requires the update or data. This may negatively impact a consumer's data cap because the same data is being downloaded multiple times. Furthermore, repeatedly downloading the same data for each device that requires it may negatively impact network quality attributes, such as bandwidth.

The embodiments disclosed herein address the issues above and thus help solve the above technical problems and improve download management technology by providing a technical solution that ensures that data, such as updates, are downloaded as few times as possible, and is distributed to each user device which requires the data and is connected to the same network as the device downloading the data. In some embodiments, the download manager system identifies one or more devices connected to a network, and obtains device information describing each of the devices. The download manager system detects a first device connected to the network is downloading data and determines whether a second device may need to download the same data based on the device information for the first device and the device information for the second device. The download manager causes the downloaded data to be stored based on a determination that the second device will need to download the data. The download manager system detects that the second device requires the data and causes the data to be transmitted to the second device.

In some embodiments, the device information includes data describing one or more of: a device type, a device version, hardware connected to the device, driver versions for the hardware connected to the device, an operating system type, an operating system version, software used by the device, a version of the software used by the device, and any other data which may be used to describe the device or software which runs on the device.

In some embodiments, the data comprises an update for software which runs on the device. The data may comprise data other than an update, such as streamed media, software or a software installer, a web-page, or other data which may be downloaded by a user device.

In some embodiments, determining whether the second device may need to download the data is performed by using an artificial intelligence or machine learning model. The artificial intelligence or machine learning model may be trained to predict whether a device may need to download the data based on one or more of the: content of the data, the source of the data, the device information for the device downloading the data, the device information for the device which may need the data, and other data useful to predict whether a device may require certain data in the future. In some embodiments, the download manager system may determine whether the second device may need to download the data by performing statistical analysis on information such as: the content of the data, the source of the data, the device information for the device downloading the data, the device information for the device which may need the data, and other data useful to predict whether a device may require certain data in the future.

In some embodiments, the download manager system examines one or more packets being transmitted to the first device. The one or more packets may comprise data, such as software updates, media content streaming, software applications, etc., being downloaded by the first device. The download manager system may examine the packets to determine whether the first device is downloading the data. The download manager system may use artificial intelligence or machine learning to predict whether the device is downloading data based on one or more of: the content of the packets, metadata for the packets, device information of the device receiving the packets, and other data useful to predict whether a device is downloading data. In some embodiments, the download manager system may determine whether the first device is downloading data by performing statistical analysis on information such as the content of the packets, metadata for the packets, device information of the device receiving the packets, and other data useful to predict whether a device is downloading data. In some embodiments, the first device transmits an indication to the download manager system that it is downloading data, such as software updates, media content streaming, software applications, etc.

In some embodiments, the download manger system stores the downloaded data on a storage device connected to the download manager system and transmits the downloaded data to other devices which need the data. In some embodiments, the download manager system stores the downloaded data on the device which downloaded the data, and causes that device to transmit the downloaded data to other devices. In some embodiments, the download manager system causes the data to be stored on a device other than the device which downloaded the data. In some embodiments, the download manager system causes the data to be stored for a certain period of time, then causes the data to be deleted or moved to another storage device, after the period of time has elapsed.

In some embodiments, the download manager system receives an indication from a device when it connects to a network indicating the device's current information. The download manager system may determine whether the device will require data which has already been downloaded by another device based on the device's current information. The download manager system may prepare the data to be transmitted to the device based on a determination that it will need the downloaded data.

In some embodiments, the download manager system causes similar devices to communicate with each other to determine whether one of the devices has already downloaded data, such as a software update, streamed media, a software application, etc. The devices may communicate with each other based on a determination that they are similar devices. The download manager system may determine whether devices are similar devices based on device information for each device. For example, a household may have two Xboxes and one PlayStation. The download manager system may determine the Xboxes are similar devices and cause the Xboxes to communicate with each other when they stream media or download update data. However, the download manager system would also determine that the PlayStation is a different device and is not likely to require the same software updates as the Xboxes, but may require the same streamed media content. Thus, the PlayStation may communicate with the Xboxes to determine if they had already downloaded streamed media content, but not to determine if they had downloaded the latest update.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

FIG. 1 is a diagram depicting an example download manager system and a user premises 100 in which a download manager system may be implemented. It is to be appreciated that FIG. 1 illustrates just one example of a user premises 100 and that the various embodiments discussed herein are not limited to the use of such an environment. The example user premises 100 includes a download manager system 101 and one or more user devices 103a-103d. The user premises 100 may include a variety of user devices 103a-103d which may be communicatively coupled to one or more download manager systems 101 and/or to each other.

The user premises may also include an optional network, communication system, or networked system (not shown), to which the download manager system 101, as well as user devices 103a-103d (collectively referred to as endpoint devices), may be coupled. Non-limiting examples of such a network or communication system include, but are not limited to, an Ethernet system, twisted pair Ethernet system, an intranet, a local area network ("LAN") system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. One or more endpoint devices, such as PCs, tablets, laptop computers, smartphones, personal assistants, Internet connection devices, gaming systems, wireless LAN, WiFi, Worldwide Interoperability for Microwave Access ("WiMax") devices, or the like, may be communicatively coupled to the network and/or to each other so that the plurality of endpoint devices are communicatively coupled together. Thus, such a network enables the download manager system 101, user devices 103a-103d, and any other interconnected endpoint devices, to communicate with each other.

The user devices 103a-103d may include devices such as cellular telephones, smartphones, tablets, personal computers, laptop computers, gaming systems wireless peripheral devices such as headphones, microphones, mice, keyboards, etc., security cameras, Internet of Things (or "smart") devices, televisions, routers, digital assistants, personal assistant devices—such as Amazon Alexa, Google Home, etc.,—drones, etc. The user devices 103a-103d may interconnect to one or more communications media or sources, such as routers, network switches, modems, etc., to transmit communications to other devices. The user devices 103a-103d may download data, such as software updates, streaming data, software applications, etc., which may be detected by the download manager system 101.

The above description of the user premises 100, and the various devices therein, is intended as a broad, non-limiting overview of an example environment in which various embodiments of a download manager system. The user premises 100 and the various devices therein, may contain other devices, systems and/or media not specifically described herein.

Example embodiments described herein provide applications, tools, data structures and other support to implement systems and methods for managing downloads for user devices and ensuring data is downloaded as few times as possible. The example embodiments described herein additionally provide applications, tools, data structures and other support to implement systems and methods for predicting when data is being downloaded and when other devices may need the downloaded data. Other embodiments of the described techniques may be used for other purposes, including for causing user devices to communicate with each other to obtain downloaded data form each other. In the description provided herein, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
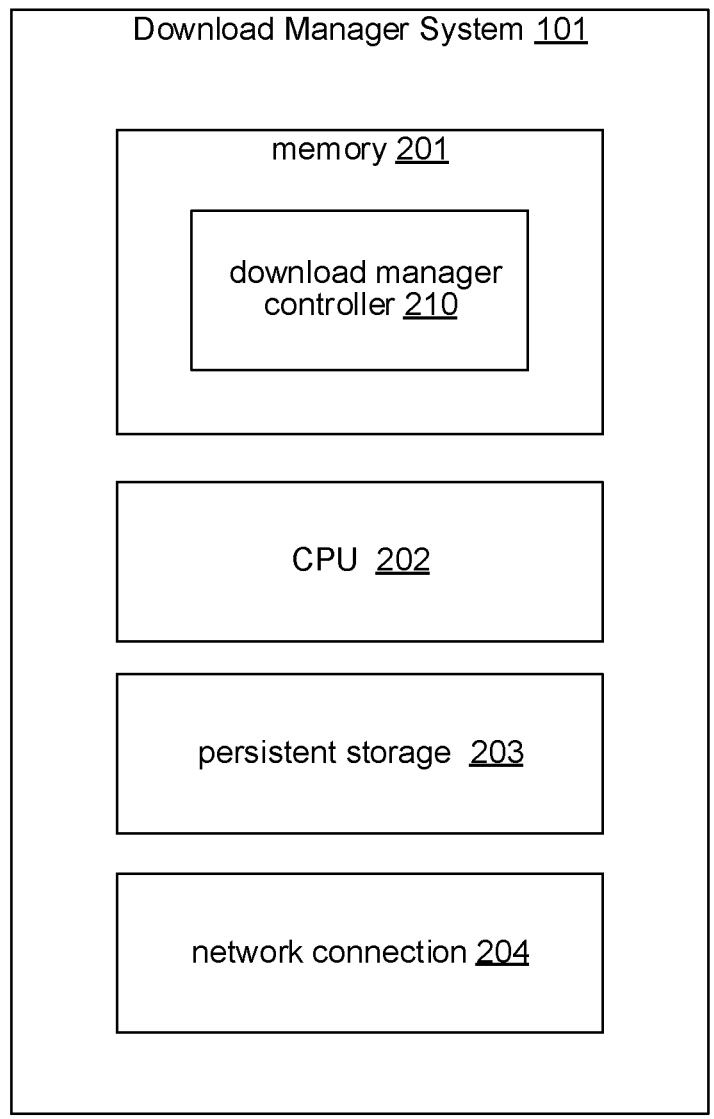
FIG. 2 is a block diagram depicting example components incorporated in a download manager system on which the download management system may operate, according to various embodiments described herein.

FIG. 2 is a block diagram depicting example components incorporated in a download manager system 101 on which the download management system may operate, according to various embodiments described herein. In various embodiments, the download manager system 101 includes one or more of the following: a computer memory 201 for storing programs and data while they are being used, including data associated with the download manager system, an operating system including a kernel, and device drivers; a central processing unit ("CPU") 202 for executing computer programs; a persistent storage device 203, such as a hard drive or flash drive for persistently storing programs and data; and a network connection 204 for connecting to one or more user devices, such as user devices 103a-103d and/or other computer systems, to send and/or receive data, such as via the Internet or another network and associated networking hardware, such as switches, routers, repeaters, electrical cables and optical fibers, light emitters and receivers, radio transmitters and receivers, and the like, and to scan for and retrieve signals from user devices 103a-103d. While a download manager system 101 configured as described above is typically used to support the operation of the download management system, those skilled in the art will appreciate that the download manager system may be implemented using devices of various types and configurations, and having various components. The memory 201 may include a download manager controller 210 which contains computer-executable instructions that, when executed by the CPU 202, cause the download manager system 101 to perform the operations and functions described herein. For example, the programs referenced above, which may be stored in computer memory 201, may include or be comprised of such computer-executable instructions.

The download manager controller 210 performs the core functions of the download manager system 101, as discussed herein and also with respect to FIGS. 4 through 9. In particular, the download manager controller 210 obtains data from the user devices 103a-103d, and uses the data to determine whether a particular user device is downloading data which may be used by other user devices. The download manager controller 210 may additionally include instructions to receive an indication from the user device of the device type, software on the device, and other device information for a user device 103a-103d. The download manager controller 210 may additionally contain computer-executable instructions to cause the download manager system to perform some or all of the operations further described in FIGS. 4-9. The download manager controller 210 may additionally contain computer-executable instructions to implement an artificial neural network, machine learning, and/or other artificial intelligence components of the system to predict whether a user device 103a-103d is downloading data. The download manager controller 210 may also include computer-executable instructions for receiving input and using that input to predict whether another user device will require data downloaded by a user device 103a-103d.

In an example embodiment, the download manager controller 210 and/or computer-executable instructions stored on memory 201 of the download manager system 101 are implemented using standard programming techniques. For example, the download manager controller 210 and/or computer-executable instructions stored on memory 201 of the download manager system 101 may be implemented as a "native" executable running on CPU 202, along with one or more static or dynamic libraries. In other embodiments, the download manager controller 210 and/or computer-executable instructions stored on memory 201 of the download manager system 101 may be implemented as instructions processed by a virtual machine that executes as some other program.

Figure 3:
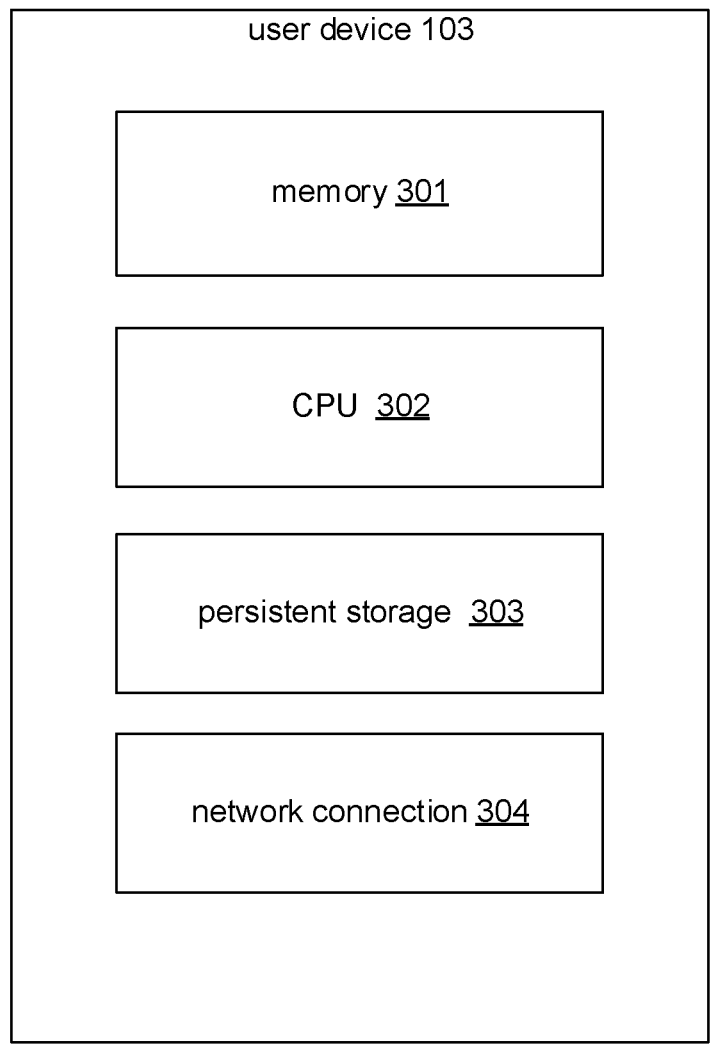
FIG. 3 is a block diagram depicting example components incorporated in a user device which may be included in the download management system, according to various embodiments described herein.

FIG. 3 is a block diagram depicting example components incorporated in a user device 103 which may be included in the download management system, according to various embodiments described herein. In various embodiments, the user device 103 includes one or more of the following: a computer memory 301 for storing programs and data while they are being used, including data associated with the download manager system, an operating system including a kernel, and device drivers; a central processing unit ("CPU") 302 for executing computer programs; a persistent storage device 303, such as a hard drive or flash drive for persistently storing programs and data; and a network connection 304 for connecting to one or more user devices, such as user devices 103a-103d, a download manager system 101, and/or other computer systems, to send and/or receive data, such as via the Internet or another network and associated networking hardware, such as switches, routers, repeaters, electrical cables and optical fibers, light emitters and receivers, radio transmitters and receivers, and the like. The memory 301 may include computer-executable instructions to perform some, or all, of the functionality described herein, and with regard to FIGS. 4-9. While a user device 103 configured as described above is typically used to support the operation of the download management system, those skilled in the art will appreciate that the download management system may be implemented using devices of various types and configurations, and having various components.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the download manager system.

In addition, programming interfaces to the data stored as part of the download manager controller 210, can be available by standard mechanisms such as through C, C++, C#, and Java APIs; libraries for accessing files, databases, or other data repositories; through scripting languages such as JavaScript and VBScript; or through Web servers, FTP servers, or other types of servers providing access to stored data. The download manager controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the download manager system 101 and/or the user devices 103a-103d.

Furthermore, in some embodiments, some or all of the components/portions of the download manager controller 210 and/or functionality provided by the computer-executable instructions stored on memory 201 of the download manager system 101 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the download manager system, user devices, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

FIG. 4 is a table diagram showing sample contents of a device identification table used by the download manager system 101, according to various embodiments described herein. For example, the device identification table may be, include, or comprise a data structure and associated data stored in, or accessible by, the download manager system 101 and/or one or more user devices 103a-103d. In some embodiments, the information represented in the device identification table may be stored in various different types of data structures and/or in a neural network implemented or accessible by the download manager system 101 and/or one or more user devices 103a-103d. The device identification table contains rows, such as rows 401-406, each corresponding to a different device. Each row is divided into the following columns: a device id column 410, a device name column 411, and a version column 412.

The device id column 410 includes information indicating a device identified by the download manager system. The device id column 410 may include a unique identifier for each device to allow the download manager system to reliably differentiate devices from each other. The device name column 411 includes a device name for each device identified by the download manager system. The device name may be obtained through user input, a signal from the device indicating its name, a signal or packet information transmitted by the device, etc. The version column 412 includes information identifying the current version of the device. The device version may be obtained through user input, a signal from the device indicating its version, a signal or packet information transmitted by the device, etc.

FIG. 5 is a table diagram showing sample contents of a device software version table used by the download manager system 101, according to various embodiments described herein. For example, the device software version table may be, include, or comprise a data structure and associated data stored in, or accessible by, the download manager system 101 and/or one or more user devices 103a-103d. In some embodiments, the information represented in the device software version table may be stored in various different types of data structures and/or in a neural network implemented or accessible by the download manager system 101 and/or one or more user devices 103a-103d. The device software version table contains rows, such as rows 501-506, each corresponding to a different device and software on the device. Each row is divided into the following columns: a device id column 510, a device name column 511, a software name column 512, and a software version column 513.

The device id column 510 and device name column 511 are similar to the device id column 410 and device name column 411 respectively. The software name column 512 includes information identifying software which is present on the device. The software name may be obtained through user input, a signal from the device indicating its version, a signal or packet information transmitted by the device, etc. The software version column 513 includes information identifying the current version of the software. The software version may be obtained through user input, a signal from the device indicating its version, a signal or packet information transmitted by the device, etc. The software identified in the software name and software version columns may be operating systems, video games, background applications and processes, foreground applications and processes, video streaming, and other types of software which may be executed in a user device.

For example, rows 504 and 503 indicate that device "1111" has a "Web Browser," with software version 5.5, and is streaming "Superhero Movie 3." Likewise, row 501 indicates that "Pear Tablet 1" has a photo manager with a software version 1.5, while row 502 indicates that "Pear Tablet 2" has a photo manager with software version 2.2.

FIG. 6 is a table diagram showing sample contents of a downloaded data table used by the download manager system 101, according to various embodiments described herein. For example, the download data table may be, include, or comprise a data structure and associated data stored in, or accessible by, the download manager system 101 and/or one or more user devices 103*a*-103*d*. In some embodiments, the information represented in the download data table may be stored in various different types of data structures and/or in a neural network implemented or accessible by the download manager system 101 and/or one or more user devices 103*a*-103*d*. The download data table contains rows, such as rows 601-503, each corresponding to different downloaded data for a particular device. Each row is divided into the following columns: a device id column 610, a device name column 611, a software name column 612, and a downloaded data column 613.

The device id column 610, device name column 611, and software name column 612 are similar to the device id column 510, device name column 511, and software name column 512 respectively. The downloaded data column includes information indicating data downloaded by a particular device which has been stored based on a determination that another device may require the data.

For example, row 601 indicates that Pear Tablet 2 has downloaded update version 2.2 for the Photo Manager. Referring back to row 501 in FIG. 5, Pear Tablet 1 has the Photo Manager at version 1.5. Thus, once the Pear Tablet 1 requests update data to update the Photo Manager to version 2.2, the download manager system may cause the update data already downloaded by Pear Tablet 2 to be transmitted to Pear Tablet 1. Thus, Pear Tablet 1 does not need to access the Internet, or another device outside of the local network to obtain the update for the Photo Manager.

As another example, row 603 indicates that Windows 10 Laptop is streaming a move, and has already downloaded the data required to stream the movie. Referring back to FIG. 5, row 504 indicates that Windows 10 PC is also streaming the same movie. Thus, Windows 10 PC may receive the streamed data from Windows 10 Laptop, rather than receiving the streamed data from outside of the local network.

Figure 7:
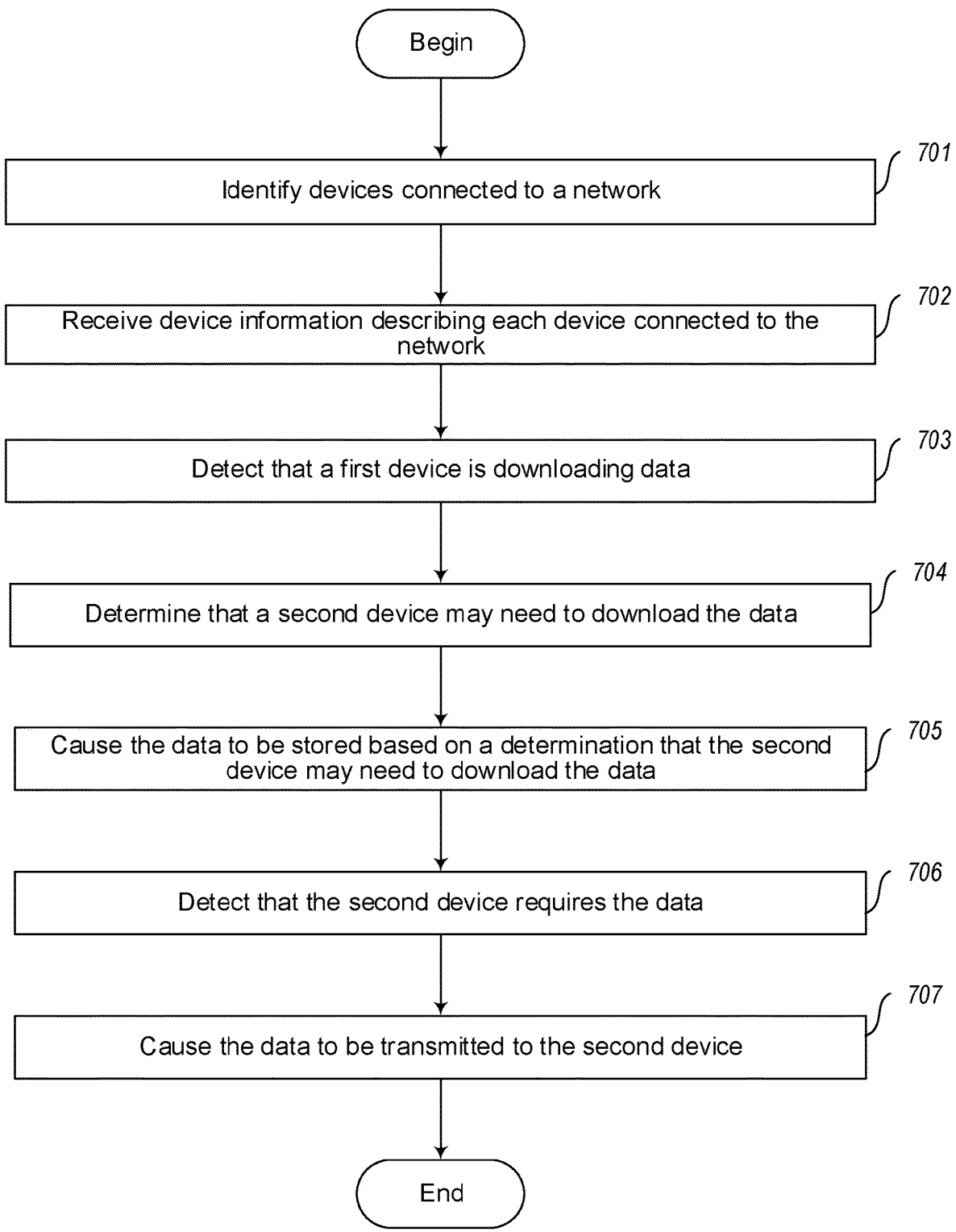
FIG. 7 is a flow diagram depicting a process to ensure data is downloaded as few times as possible by using a download manager system, according to various embodiments described herein.

FIG. 7 is a flow diagram depicting a process to ensure data is downloaded as few times as possible by using a download manager system, according to various embodiments described herein. At act 701, the download manager system identifies one or more devices connected to a network. At act 702, the download manager system receives device information describing each device connected to the network. The device information may further include information describing software used by one or more devices connected to the network.

At act 703, the download manager system detects that a first device is downloading data. The download manager system may detect that the first device is downloading data based on an indication from the first device that it is downloading data. The download manager system may detect that the first device is downloading data based on information obtained from packets being routed to or from the first device. The download manager system may determine whether the first device is downloading data based on a prediction that the first device is downloading data. The prediction that the first device is downloading data may be obtained by applying statistical analysis, artificial intelligence, or a machine learning model trained to predict whether a device is downloading data, based on one or more of: packet information from packets routed to or from the first device, the device information of the first device, software information of the first device, the last time the device or software on the device was updated, and other information related to downloading data.

At act 704, the download manager system determines that a second device may need to download the data. The download manager system may determine that a second device may need to download the data based on a prediction of whether another device on the network will need the data. The prediction that a second device will need the data may be obtained by applying statistical analysis, artificial intelligence, or a machine learning model trained to predict whether a device will require particular data, based on one or more of: the device information for both devices, the software information for software on both devices, information describing the downloaded data, and other information usable to determine whether a device or software may require particular data.

At act 705, the download manager system causes the data to be stored based on a determination that the second device may need to download the data. The download manager system may cause the data to be stored on a storage device accessible to the download manager system. The download manager system may cause the data to be stored on the first device. The download manager system may cause the data to be stored on a third computing device which can be connected to the same network as the second computing device.

At act 706, the download manager system detects that the second device requires the data. The second device may transmit an indication to the download manager system that it requires the downloaded data. The download manager system may detect that the second device has connected to a local network, and transmit an indication to the second device that the download manager system has stored downloaded data which the second device may need. The download manager system may cause the second device to communicate with the first device to determine whether it requires the data.

At act 707, the download manager system causes the downloaded data to be transmitted to the second device. After act 707, the process ends. In some embodiments, the downloaded data is an update for software used by the first device and second device. In some embodiments, the downloaded data comprises media content streamed to the first device and second device.

Figure 8:
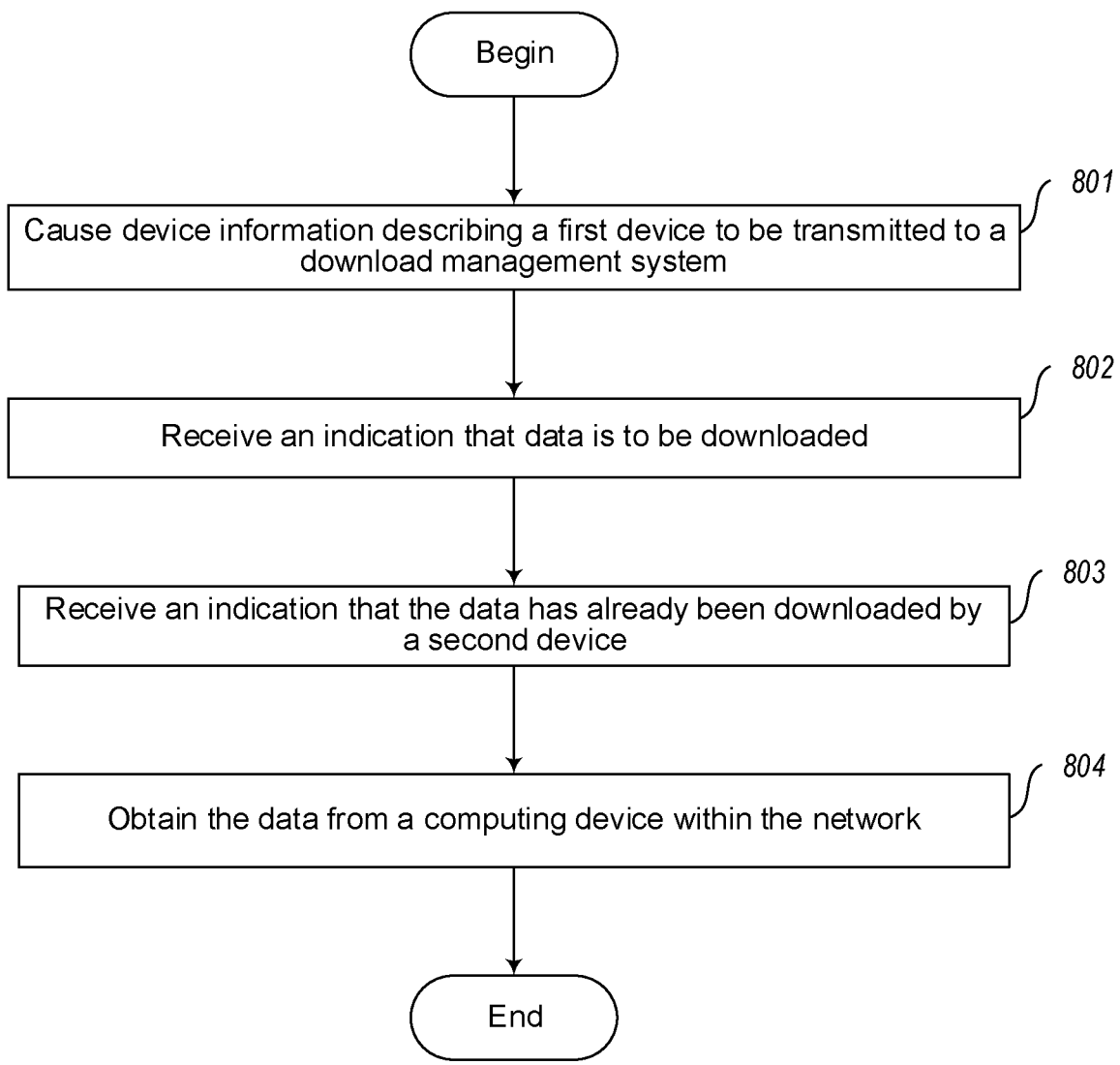
FIG. 8 is a flow diagram depicting a process to request previously downloaded data from a download manager system, according to various embodiments described herein.

FIG. 8 is a flow diagram depicting a process to request previously downloaded data from a download manager system, according to various embodiments described herein. At act 801, a user devices causes device information describing itself to be transmitted to a download management system. At act 802, the user device receives an indication that it must download particular data.

At act 803, the user device receives an indication that the particular data has already been downloaded by a second user device. The user device may receive the indication after transmitting an indication to a download manager system that the user device intends to download the particular data. The user device may receive the indication after beginning the download, and the download manager system detecting that the user device has begun to download the particular data.

At act 804, the user device obtains the particular data from a computing device within the local network that the user device is connected to. The computing device may be one or more of: the download manager system, the user device which first downloaded the data, a third computing device, or any other computing device capable of storing data. After act 804, the process ends.

Figure 9:
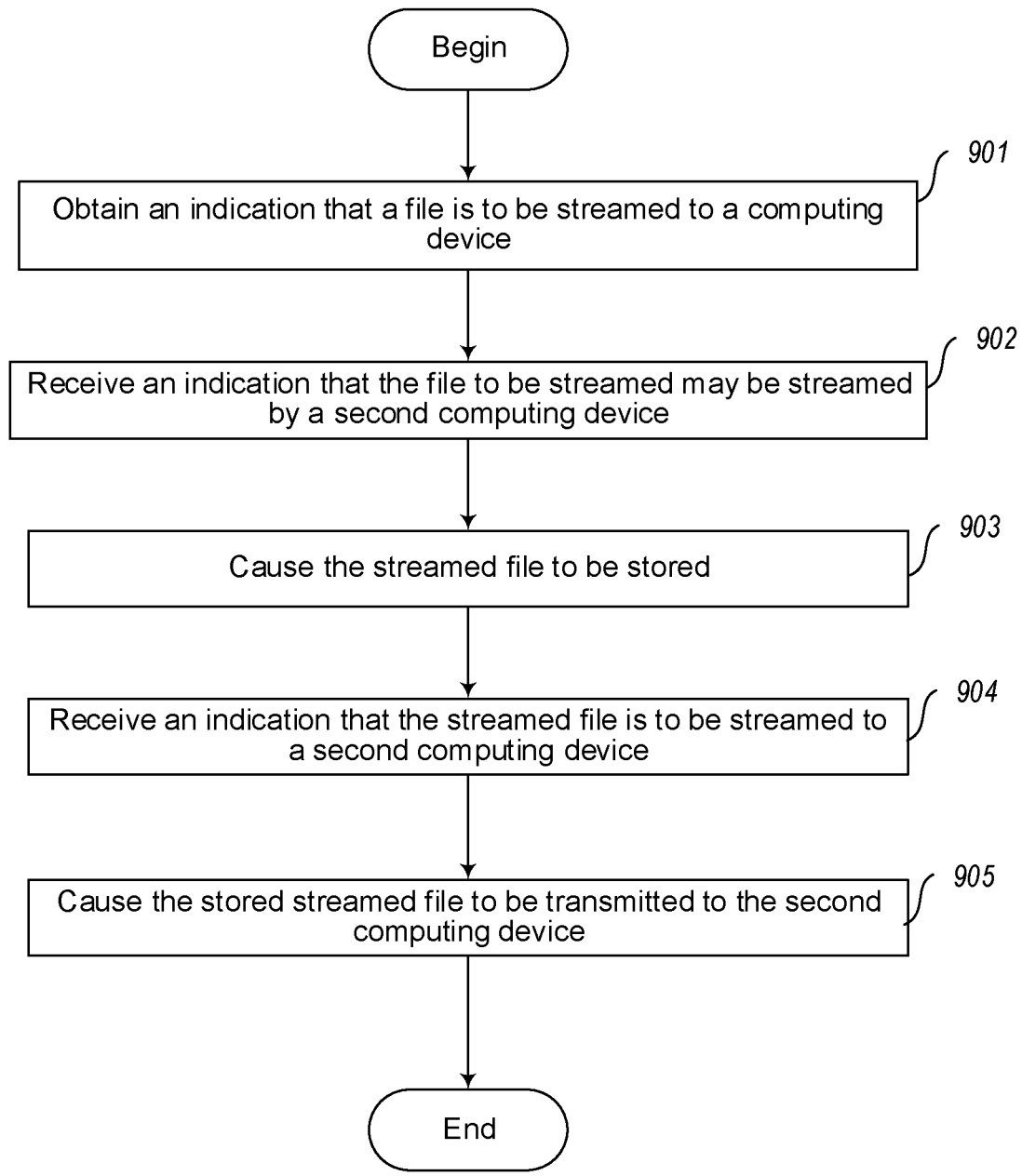
FIG. 9 is a flow diagram depicting a process to ensure streamed data is directly streamed to as few computing devices as possible, according to various embodiments described herein.

FIG. 9 is a flow diagram depicting a process to ensure streamed data is directly streamed to as few computing devices as possible, according to various embodiments described herein. At act 901, the download manager system obtains an indication that a file is to be streamed to a computing device. The streamed file may be streamed media, such as an audio file, video file, video game, etc., or any other type of data that may be streamed to a computing device. At act 902, the download manager system receives an indication that the file to be streamed may be streamed by a second computing device.

At act 903, the download manager system causes the streamed file to be stored. The streamed file may be stored on one or more of the user device streaming the file, the download manager system, a third computing device, or any other device on which data can be stored. At act 904, the download manager system receives an indication that the streamed file is to be streamed to the second computing device. At act 905, the download manager system causes the stored streamed file to be transmitted to the second computing device. After act 905, the process ends.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a download management system connected to a local network, the method comprising:
   electronically identifying one or more devices connected to the local network, wherein identifying the one or more devices includes obtaining device information describing software used by each device of the one or more devices;
   at a first time:
      electronically detecting that a first device of the one or more devices is downloading data, wherein the first device is accessing the local network contemporaneously with downloading the data;
      contemporaneously with the downloading of the data by the first device, electronically determining that a second device of the one or more devices is predicted to download the data at a time after the first time based on the device information describing the second device, wherein the second device is accessing the local network; and
      electronically causing the data to be stored based on a determination that the second device will need to download the data; and
   at a second time after the first time:
      electronically detecting that the second device requires the data; and
      electronically causing the stored data to be transmitted to the second device.

2. The method of claim 1, wherein the device information comprises one or more of a device type and a device version.

3. The method of claim 1, wherein the data comprises an update for the first device and the second device.

4. The method of claim 1, wherein the data comprises streamed media.

5. The method of claim 1, wherein electronically determining that the second device is predicted to download the data further comprises:
   electronically receive an indication of a device type of the first device, an indication of a device type of the second device, an indication of information describing a type of the data downloaded by the first device, and an indication of information describing one or more shared applications of the first device and the second device, wherein the device type of the second device and one or more applications included of the second device are able to be derived based on the device information describing the second device; and
   electronically obtaining a determination of whether the second device is predicted to download the data by applying the device type of the first device, device type of the second device, information describing a type of the data downloaded by the first device, and information describing one or more shared applications of the first device and the second device to a machine learning model trained to predict whether a device is predicted to download data based on at least an indication of one or more device types, an indication of one or more types of data, and an indication of one or more shared applications.

6. The method of claim 1, wherein detecting that the first device is downloading data further comprises electronically examining one or more packets being transmitted to the first device.

7. The method of claim 6, wherein detecting that the first device is downloading data further comprises:
electronically obtaining a determination of whether the first device is downloading at least one selected type of data by applying at least one packet transmitted to the first device to a machine learning model trained to determine whether a device is downloading data based on at least one or more packets transmitted to a device.

8. A method in a first computing device connected to a local network, the method comprising:
electronically causing device information describing the first computing device to be transmitted to a download management system connected to the local network, wherein the device information includes information describing software used by the first computing device;
electronically receiving an indication that data is to be downloaded from a source outside of the local network;
electronically receiving an indication from the download management system that the data has already been downloaded by a second computing device of a plurality of computing devices connected to the network, wherein the download management system caused the data to be stored based on a determination that the first computing device was likely to download the data,
wherein the determination that the first computing device was likely to download the data was made contemporaneously with the downloading of the data by the second computing device, and
wherein the determination was based on at least:
the device information describing software used by the first computing device;
device information describing software used by the second computing device; and
information describing the data; and
electronically obtaining the data that has already been downloaded from at least one computing device of the plurality of computing devices connected to the network.

9. The method of claim 8, wherein the data is obtained from the second computing device.

10. The method of claim 8, wherein the data is obtained from the download management system.

11. The method of claim 8, wherein the data comprises an update for the first device and the second device.

12. The method of claim 8, wherein the data comprises streamed media.

13. The method of claim 8, wherein obtaining the data that has already been downloaded from a computing device within the network comprises:
electronically receiving, via the download management system, an indication of a third computing device on which the downloaded data was stored, wherein the second computing device was caused to transmit the downloaded data to the third computing device based on instructions received by the second computing device; and
electronically transmitting a request to the third computing device to transmit the downloaded data to the first computing device.

14. A system comprising:
at least one processor; and
at least one memory coupled to the at least one processor, the memory having computer-executable instructions stored thereon that, when executed by the at least one processor, cause the system to perform:
electronically identify one or more devices connected to a local network, wherein identifying the one or more device includes obtaining device information describing each device of the one or more devices, wherein the device information for each respective device of the one or more devices includes information describing software used by the respective device;
at a first time:
electronically detect that a first device of the one or more devices is downloading data, the first device being connected to the local network;
contemporaneously with the downloading of the data by the first device, electronically determine that a second device of the one or more devices is likely to download the data at a time after the first time based on the device information describing the second device, the second device being connected to the local network; and
electronically cause the data to be stored based on a determination that the second device will need to download the data; and
at a second time after the first time:
electronically detect that the second device requires the data; and
electronically cause the stored data to be transmitted to the second device.

15. The system of claim 14, wherein the device information comprises one or more of a device type and a device version.

16. The system of claim 14, wherein the data comprises an update for the first device and the second device.

17. The system of claim 14, wherein the data comprises streamed media.

18. The system of claim 14, wherein the computer-executable instructions, when executed by the at least one processor, further cause the system to:
electronically cause the data not to be stored based on a determination that the second device is not likely need to download the data.

19. The system of claim 14, wherein detecting that the first device is downloading data further comprises electronically examining one or more packets being transmitted to the first device.

20. The system of claim 19, wherein detecting that the first device is downloading data further comprises:
electronically obtaining a determination of whether the first device is downloading at least one selected type of data by applying at least one packet transmitted to the first device to a machine learning model trained to determine whether a device is downloading at least one selected type of data based on at least one or more packets transmitted to a device.

* * * * *